United States Patent [19]
Popp et al.

[11] Patent Number: 5,568,711
[45] Date of Patent: Oct. 29, 1996

[54] ATTACHMENT ANCHOR ASSEMBLY

[75] Inventors: Franz Popp, Buchloe; Andreas Sedlmeier, Ummendorf, both of Germany

[73] Assignee: Hilti Aktiengesellschaft, Schaan, Germany

[21] Appl. No.: 409,552

[22] Filed: Mar. 23, 1995

[30] Foreign Application Priority Data

Apr. 20, 1994 [DE] Germany ............... 44 13 743.5

[51] Int. Cl.[6] .................................................. E04C 5/12
[52] U.S. Cl. ..................... 52/704; 52/98; 52/707; 405/259.5; 405/259.6; 411/82; 411/930
[58] Field of Search ................. 52/698, 98, 704, 52/705, 707, 295; 405/259.5, 259.6; 411/82, 930; 238/319, 377, 382; 248/679, 680

[56] References Cited

U.S. PATENT DOCUMENTS

Re. 25,869  5/1960  Schuermann et al. ........... 52/698 X
4,211,049   7/1980  Fischer ........................... 52/704

Primary Examiner—Carl D. Friedman
Assistant Examiner—Timothy B. Kang
Attorney, Agent, or Firm—Anderson, Kill & Olick P.C.

[57] ABSTRACT

An attachment anchor assembly for securing a component (15) to a base material (U) includes an axially extending anchor rod (11) having an axially extending anchoring region and a centering sleeve (18) laterally enclosing the anchor rod in a sealing manner and spaced from the anchoring region. A sealing element (19) is located between the centering sleeve (18) and the anchoring region and laterally encloses the anchor rod (11) in a sealing manner. The sealing element (19) has a transverse sealing surface facing towards the anchoring region and the sealing surface can be displaced axially towards the centering sleeve.

8 Claims, 2 Drawing Sheets

ATTACHMENT ANCHOR ASSEMBLY

The present invention is directed to an attachment anchor assembly for securing a component on the surface of a base material by inserting an anchoring region of an anchor rod into a prefabricated borehole, filled with a curable or hardenable mass, in the base material. The component has a through opening for a trailing end region of the anchor rod equipped with a force engagement means and the trailing end region projects out of the borehole. The anchor rod is laterally enclosed by a centering sleeve between the force engagement means and the anchoring region.

An attachment anchor for expansion pressure-free fastening in lower strength base materials is disclosed in DE-OS 30 14 569. An anchoring region of the attachment anchor is inserted into a borehole filled with a hardenable or curable mass in the base material. A centering sleeve laterally encloses the anchor rod in the mouth region of the borehole, so that the centering sleeve centers the anchor rod in the borehole. The centering sleeve bears radially against the inside surface of the borehole. A structural component with a through opening bears on the surface of the base material with the attachment anchor extending through the through opening. Load engagement means are located on an end region of the anchor rod extending out of the borehole for pressing the component against the surface of the base material. The centering sleeve has axially extending grooves at its circumference affording displacement of a portion of the hardenable mass from the borehole when the anchor rod is inserted into the borehole filled with the hardenable mass. The hardenable mass displaced from the borehole reaches the surface of the base material and hardens there, so that the hardenable mass displaced out of the borehole must be removed by a suitable manual tool, in particular a knife, before placing the component on the surface of the base material. Further, a change in position, such as a tightening of the component, is not possible because the hardened mass forms a rigid stop.

SUMMARY OF THE INVENTION

Therefore, the primary object of the present invention is to provide an attachment anchor assembly which prevents the hardenable mass from flowing over the surface of the base material laterally outwardly from the assembly when the attachment anchor is inserted into the borehole in the base material and, in addition, to prevent the hardenable mass from interfering with the function of the attachment anchor.

In accordance with the present invention, a sealing element, laterally enclosing the anchor rod in a sealing manner, is provided between the centering sleeve and the anchoring region of the anchor rod, with the sealing element having a transverse sealing surface facing the anchoring region and being displaceable towards the centering sleeve.

An object of the invention is to locate the sealing element with the sealing surface forwardly of the centering sleeve with the sealing element protruding along with the centering sleeve into an opening. Due to the displaceability of the sealing surface, a displacement of the centering sleeve relative to the hardenable mass is possible. To afford the sealing action between the anchoring region of the anchor rod and the inside surface of the borehole, the outside diameter of the sealing surface corresponds to the outside diameter of the centering sleeve.

For the displacement of the sealing surface towards the centering sleeve when the anchor rod is inserted into the borehole, preferably the sealing surface is part of a compressible sealing ring formed expediently of elastic foamed material.

Displacement of the sealing surface of the sealing ring is also possible, if the sealing surface is preferably part of a sealing ring spaced axially from the centering sleeve by rated breaking webs. The centering sleeve, the rated breaking webs and the sealing ring are connected to one another forming a single unit for manufacturing and application reasons. The centering sleeve and sealing ring are arranged essentially coaxially to one another. Preferably, the unit is formed of plastics material, so that it can be manufactured economically.

To assure improved guidance of the anchor rod within the borehole, preferably the unit includes centering means at the sealing surface engaging in the anchoring region with the centering means connected to the sealing surface. For example, the centering means are segment-like shaped and extend from the sealing surface of the sealing element into the borehole extending in the axial direction of the anchor rod. The outside diameter of the centering means corresponds substantially to the diameter of the borehole.

It is expedient that the sealing element is disposed in tightly fitting engagement with the surface of the through opening in an elastic insulation element, so that components in the form of support plates of a rail system can be arranged with the interposition of the elastic insulation element on the base material in the form of a concrete tie. Before placing the attachment anchor rod into the borehole in a base material filled with the hardenable mass, initially the elastic insulation element is placed on the surface of the base material with the through opening oriented essentially coaxially with the axis of the borehole. The component is placed upon the elastic insulation element with the surface forming a through opening aligned with the surface forming the through opening in the elastic insulation element and with its axis aligned with the borehole. Subsequently, the attachment anchor rod is inserted into the borehole with its anchoring region located inside the borehole. The sealing element located on the anchor rod is positioned in the region of the elastic insulation element and bears in a sealing manner at the surface of the through opening and at the surface of the anchor rod. The through openings in the elastic insulation element and in the component can have a larger diameter than that of the borehole. The portion of the hardenable mass displaced upon the insertion of the attachment anchor rod only reaches the sealing surface of the sealing element.

The various features of novelty which characterize the invention are pointed out with particularity in the claims annexed to and forming a part of this disclosure. For a better understanding of the invention, its operating advantages and specific objects attained by its use, reference should be had to the drawing and descriptive matter in which they are illustrated and described preferred embodiments of the invention.

DETAILED DESCRIPTION OF THE INVENTION

Figure 1:
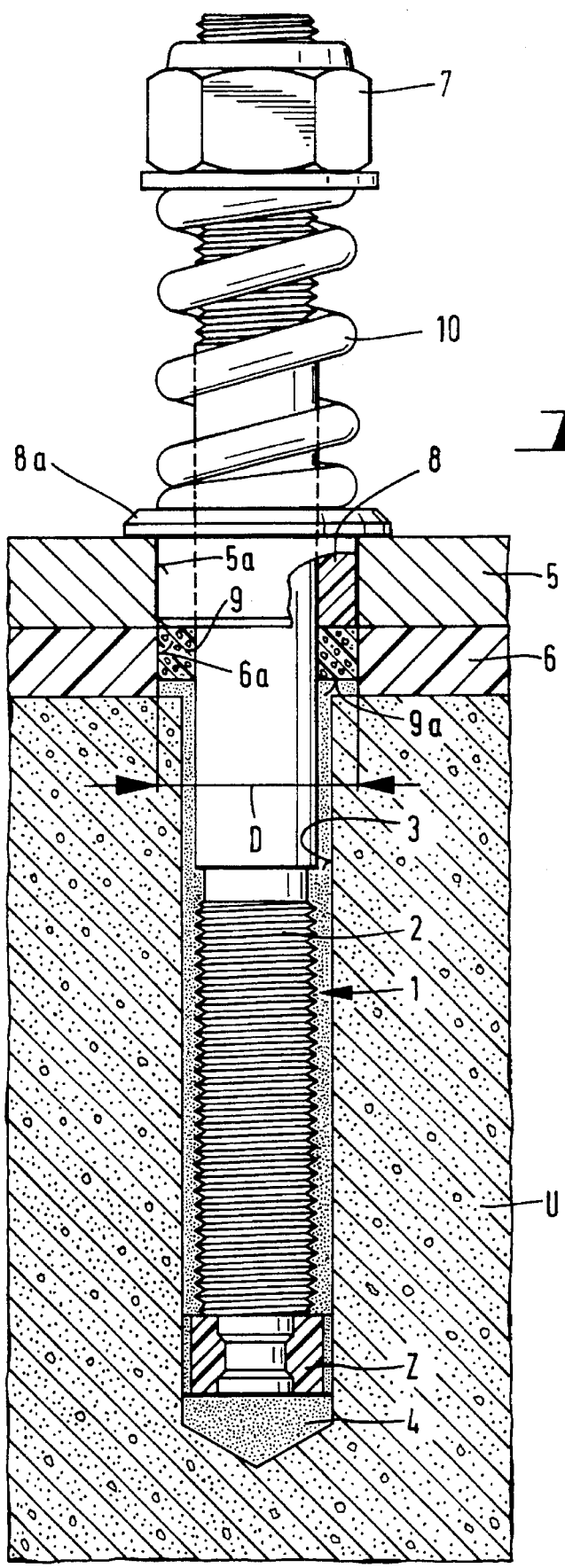
FIG. 1 is an axially extending view, partially in section, of an attachment anchor assembly embodying the present invention with a sealing element in the shape of a compressible sealing ring.
Figure 2:
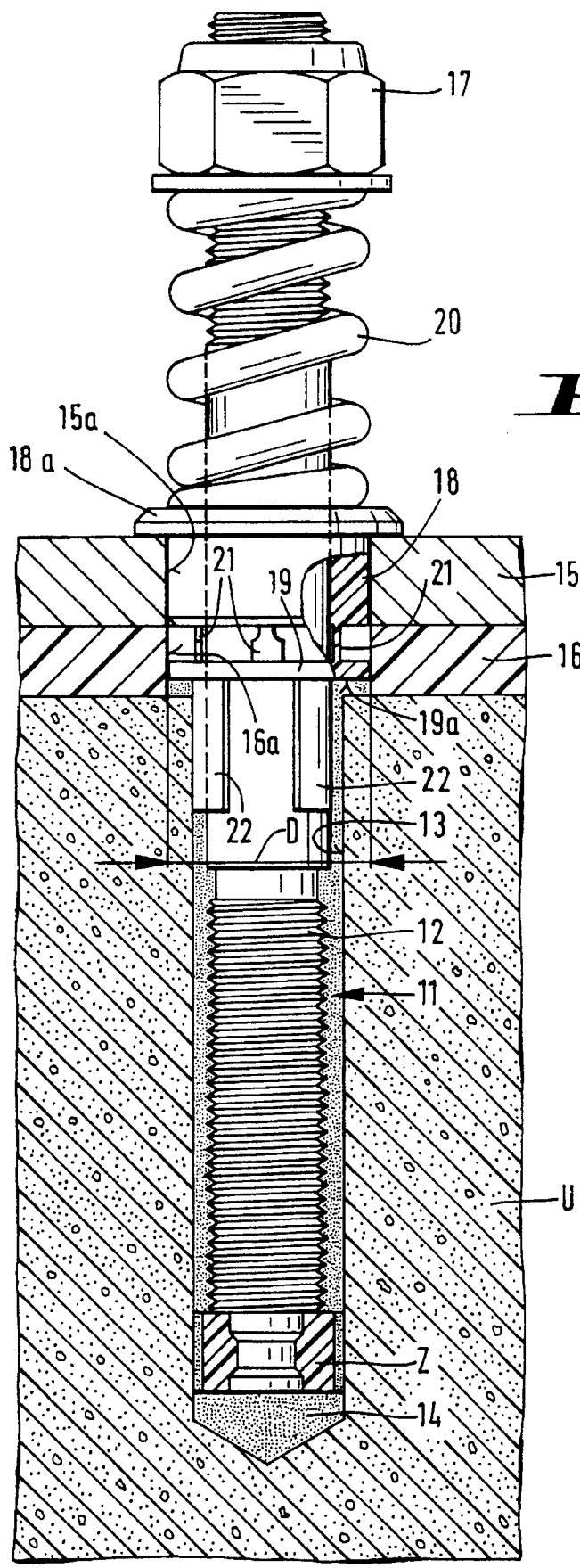
FIG. 2 is an axially extending view of another attachment anchor assembly embodying the present invention including a sealing element connected to a centering sleeve by rated breaking webs.

In FIGS. 1 and 2 a non-prestressed attachment anchor assembly is inserted into an axially extending borehole 3, 13 filled with a hardenable mass 4, 14 and arranged to secure a component 5, 15 in the form of a support plate of a rail system on a base material U in the form of a concrete tie with an elastic insulation element 6, 16 positioned between the surface of the base material U and the component 5, 15. An axially extending anchor rod 1, 11 of the attachment anchor assembly has an anchoring region 2, 12 extending into a prefabricated borehole 3, 13 in the base material U with the borehole filled with hardenable mass 4, 14. The component 5, 15 has a through opening 5a, 15a and the elastic insulation element has a through opening 6a, 16a positioned coaxially with the axis of the borehole 3, 13. The through openings 5a, 15a, 6a, 16a have the same diameter, which exceeds the diameter of the borehole 3, 13. A centering element Z is located in the base of the borehole 3, 13 and bears radially outwardly against the surface of the borehole and serves as a centering member for the shaped leading end of the anchoring region 2, 12 of the anchor rod 1, 11.

An annular sealing element 9, 19 is located in the axially extending region of the through opening 6a, 16a of the elastic insulation element 6, 16 and is in sealing contact with the surface of the anchor rod 1, 11 and with the surface of the through opening 6a, 16a. The dimension of the sealing element 9, 19 in the axial direction of the anchor rod 1, 11 is preferably less than the material thickness of the elastic insulation element 6, 16. The sealing element 9, 19 has a sealing surface 9a, 19a extending transversely of the axial direction and facing towards the anchoring region 2, 12 and can be displaced toward a centering sleeve 8, 18 located in the axially extending region of the through opening 5a, 15a of the component 5, 15. The displacement can be effected on the application of an external force. The outside diameter D of the sealing surface 9a, 19a corresponds to the outside diameter of the centering sleeve 8, 18.

The centering sleeve 8, 18 extends through the through opening 5a, 15a of the component 5, 15 and serves to center the anchor rod 1, 11 relative to the through opening 5a, 15a in the component 5, 15 or relative to the borehole 3, 13 in the base material U. The outside diameter of the centering sleeve 8, 18 corresponds essentially to the diameter of the through opening 5a, 15a in the component 5, 15. The trailing end region, that is the region of the anchor rod 1, 11 located outwardly from the component 5, 15 is provided with a force engagement means 7, 17 in the form of a nut located on the anchor rod 1, 11. The centering sleeve 8, 18 cooperates with a collar 8a, 18a or a disk-shaped cover where the diameter of the collar 8a, 18a or of the disk-shaped cover is greater than the diameter of the through opening 5a, 15a in the component 5, 15. A compression spring 10, 20 encircles the anchor rod 1, 11 between the collar 8a, 18a or the disk-shaped cover and force engagement means 7, 17 so that when the spring is prestressed it presses the component 5, 15 against the surface of the base material U by means of the collar 8a, 18a or the disk-shaped cover with the interposition of the elastic insulation element 6, 16.

After the mass 4, 14 has hardened, the compression spring 10, 20 is pressed together by the force engagement means 7, 17, whereby a prestressing force is generated which presses the component 5, 15 or a support plate against the surface of the base material U.

When rail travel vehicles, not shown, pass for the first time over a rail member, not shown, of a railroad system, vertical loads are applied to the component 5, 15 or the support plate causing a vertical displacement of the component 5, 15 towards the surface of the base material U. As a result, the elastic insulation element 6, 16 is compressed in the axial direction of the anchor rod, whereby the centering sleeve 8, 18 is displaced towards the sealing surface 9a, 19a of the sealing element 9, 19.

In the attachment anchor assembly shown in FIG. 1, the sealing element 9 is a compressible sealing ring, for instance, formed of an elastic foamed material.

The attachment anchor assembly shown in FIG. 2 has the sealing element 19 in the form of a sealing ring whose height measured in the axial direction of the anchor rod 11 is smaller than the wall thickness of the elastic insulation element 16. The sealing ring is connected to the centering sleeve 18 located in the through opening 15a of the component 15 by rated breaking webs 21. The centering sleeve 18, the rated breaking webs 21 and the sealing ring are combined to form a single unit manufactured from plastics material for reasons of economy. When the load is applied to the component 15, an axial displacement at the centering sleeve 18 occurs in the same amount as that of the component, whereby the rated breaking web 21 fails. After the rated breaking webs 21 have failed, a free axial movement at the centering sleeve 18 relative to the sealing ring 19 is possible. A centering means 22 extends axially from the sealing surface 19a towards the anchoring region 12.

While specific embodiments of the invention have been shown and described in detail to illustrate the inventive principles, it will be understood that the invention may be embodied otherwise without departing from such principles.

We claim:

1. An attachment anchor assembly for securing a component (5, 15) to a base material (U), said attachment anchor assembly comprises an axially extending anchor rod (1, 11) having a leading end and a trailing end with an axially extending anchoring region (2, 12) extending from the leading end and insertable into a borehole filled with a hardenable mass (4, 14) in the base material (U) and an axially extending trailing end region arranged to extend out of the borehole in the base material (U) with the component having a through opening (5a, 15a) through which the trailing end region can extend, a force engagement means (7, 17) located on said trailing end region, a centering sleeve (8, 18) laterally enclosing said trailing-end region between said force engagement means (7, 17) and said anchoring region (2, 12), wherein the improvement comprises an annular sealing element (9, 19) laterally enclosing said anchor rod (1, 11) in a sealing manner and located between said centering sleeve (8, 18) and said anchoring region (2, 12), said sealing element comprises an annular sealing surface (9a, 19a) extending transversely of the axial direction and facing toward said anchoring region, and said sealing surface is axially displaceable towards said centering sleeve (8, 18), said sealing element (9, 19) comprises a sealing ring spaced axially from said centering sleeve (8, 18) by rated breaking webs (21).

2. An attachment anchor assembly, as set forth in claim 1, wherein said annular sealing surface (9a, 19a) having an outside diameter, said centering sleeve (8, 18) having an outside diameter corresponding to the outside diameter of said sealing surface.

3. An attachment anchor assembly, as set forth in claim 1 or 2, wherein said sealing element (9, 19) is a compressible sealing ring and said sealing ring comprises said sealing surface (9a, 19a).

4. An attachment anchor assembly, as set forth in claim 3, wherein said sealing ring is formed of an elastic foamed material.

5. An attachment anchor assembly, as set forth in claim 1, wherein said centering sleeve (18), said rated breaking webs (21) and said sealing ring (19) are connected to one another and form a single unit.

6. An attachment anchor assembly, as set forth in claim 5, wherein said single unit is formed of a plastics material.

7. An attachment anchor assembly, as set forth in claim 5, wherein said single unit comprises a centering means (22) extending axially from said sealing surface (19a) towards said anchoring region (12).

8. An attachment anchor assembly, as set forth in claim 1, wherein said component (5, 15) is a support plate for a rail system to be supported on a base material (U) with an elastic insulation element (6, 16) located between said support plate and the surface of said base material, said sealing element (9, 19) is positioned in a through opening (6a, 16a) of the elastic insulation element (6, 16) and said sealing element bears tightly against the surface of the through opening (6a, 16a) in said elastic insulation element.

\* \* \* \* \*